(12) United States Patent
Park

(10) Patent No.: US 12,311,730 B2
(45) Date of Patent: May 27, 2025

(54) WING KNOB DEVICE FOR AIR VENT

(71) Applicant: ECOPLASTIC CORPORATION, Gyeongju-si (KR)

(72) Inventor: Hae Ju Park, Gyeongju-si (KR)

(73) Assignee: ECOPLASTIC CORPORATION, Gyeongju-si (KR)

( * ) Notice: Subject to any disclaimer, the term of this patent is extended or adjusted under 35 U.S.C. 154(b) by 371 days.

(21) Appl. No.: 17/853,138

(22) Filed: Jun. 29, 2022

(65) Prior Publication Data

US 2023/0008640 A1 Jan. 12, 2023

(30) Foreign Application Priority Data

Jul. 12, 2021 (KR) .......................... 10-2021-0091144

(51) Int. Cl.
*B60H 1/00* (2006.01)
*B60H 1/34* (2006.01)

(52) U.S. Cl.
CPC ......... *B60H 1/0065* (2013.01); *B60H 1/3421* (2013.01); *B60H 2001/3471* (2013.01)

(58) Field of Classification Search
CPC ................ B60H 1/0065; B60H 1/3421; B60H 2001/3471
USPC ....................................................... 454/155
See application file for complete search history.

(56) References Cited

U.S. PATENT DOCUMENTS

| 7,162,773 | B2 * | 1/2007 | Song ................... | B60H 1/3414 |
| | | | | 454/162 |
| 10,266,032 | B2 * | 4/2019 | Lim ...................... | B60H 1/0065 |
| 2007/0111653 | A1 * | 5/2007 | Endou .................. | B60H 1/3421 |
| | | | | 454/155 |
| 2016/0375746 | A1 * | 12/2016 | Ahn ..................... | B60H 1/3421 |
| | | | | 454/155 |

FOREIGN PATENT DOCUMENTS

| KR | 20100004896 U | 5/2010 |
| KR | 20140000371 U | 1/2014 |
| WO | 2015/126222 A2 | 8/2015 |

OTHER PUBLICATIONS

Office Action issued in connection with corresponding Indian Patent Application No. 202244037353 dated Jan. 25, 2023.

* cited by examiner

*Primary Examiner* — Avinash A Savani
*Assistant Examiner* — Dana K Tighe
(74) *Attorney, Agent, or Firm* — Tarolli, Sundheim, Covell & Tummino LLP

(57) ABSTRACT

Provided is a wing knob device for an air vent, the wing knob device, which is installed in any one of a plurality of rear wings to change an angle of a rear wing and a front wing, the wing knob device including a rear knob provided to surround an exterior of the rear wing and comprising a wing inserting portion opened forward to move in a longitudinal direction of the rear wing, a front knob coupled to a front end portion of the rear knob to support a front surface of the rear wing, and
an anti-scratch structure provided between the rear wing and the front knob to limit forward/backward movement.

11 Claims, 12 Drawing Sheets

[A-A CROSS SECTION]

WING KNOB DEVICE FOR AIR VENT

CROSS REFERENCE TO RELATED APPLICATION

The present application claims priority to Korean Patent Application No. 10-2021-0091144, filed Jul. 12, 2021, the entire contents of which is incorporated herein for all purposes by this reference.

BACKGROUND OF THE INVENTION

Field of the Invention

The present invention relates to a wing knob device for an air vent, and more particularly, to a wing knob device for an air vent provided with an anti-scratch structure for preventing generation of a scratch of a rear wing.

Description of the Related Art

In general, inside a vehicle is installed an air vent that is an exit for discharging cooling or heating air and regulates the amount and direction of the discharged air.

The air vent typically includes a rear wing rotatable up and down, a front wing rotatable left and right, a wing knob for adjusting rotation of the rear wing and the front wing, etc.

FIG. 1 attached is a perspective view of a wing knob according to a conventional example, and FIGS. 2 and 3 are cross-sectional views taken along line A-A of FIG. 1 and line B-B of FIG. 2.

In FIGS. 1 to 3, reference numeral 2 indicates a wing knob device, and reference numeral 1 indicates a rear wing.

The wing knob device 2 according to the conventional example includes a knob body 21 having an inlet 22 formed open for insertedly engaging the rear wing 1 at a rear portion thereof and a knob guide 23 engaged to the inlet 22 of the knob body 21 to adjust an angle of a front wing (not shown).

Thus, after inserted engagement of the rear wing 1 through the inlet 22 of the knob body 21, the knob guide 23 is engaged to the inlet 22, thereby completing assembly of the wing knob device 2.

In this case, a guide bar 24 of a fork type is integrally formed in a rear portion of the knob guide 23 as shown in FIG. 1, and the guide bar 24 adjusts the angle of the front wing by being engaged with a rear wing (not shown).

Thus, when a user manipulates the knob body 21 up and down, the rear wing 1 insertedly engaged into the knob body 21 angularly rotates upward or downward, making up/down wind direction adjustment, whereas when the user manipulates the knob body 21 left and right, then the knob guide 23 engaged with the rear portion of the knob body 21 moves left and right, and at the same time, the front wing also angularly rotates left or right, thus making left/right wind direction adjustment.

A knob rubber (not shown) supporting the rear wing 1 is provided inside the inlet 22 of the knob body 21, thus providing uniform sense of operation when the knob body 21 is manipulated left and right along the rear wing 1.

However, when the knob body 21 is pushed forward, the wing knob device according to the conventional example may not provide the uniform sense of operation as the knob rubber is compressed, and the inlet 22 of the knob body 21 is rubbed against the rear end portion of the rear wing 1, causing a scratch.

In particular, when the knob body 21 is manipulated left and right in a state where the inlet 22 of the knob body 21 is rubbed against the rear end portion of the rear wing 1, and such manipulation is repeated, a scratch is generated in the rear end portion of the rear wing 1, degrading the quality and function of a product, and in particular, the rear end portion of the rear wing 1 is exposed to the inside of a vehicle, degrading the appearance of the inside of the vehicle.

Moreover, the wing knob device according to the conventional example has a gap with the rear wing 1 for manipulation of the knob body 21, and as the knob body 21 is guided only by the front knob guide 23, the knob body 21 is shaken due to the gap during operation.

In addition, the absence of clear sense of operation in a closing operation of the rear wing 1 causes confusion and inconvenience to the user.

SUMMARY OF THE INVENTION

The present invention is proposed in the above-described background, and aims to provide a wing knob device for an air vent, which includes an anti-scratch structure for limiting movement of a rear wing to prevent friction between a rear wing and a knob, whereby a knob rubber may normally support the rear wing and the rear wing may provide a uniform sense of operation while operating stably.

The present invention also provides a wing knob device for an air vent, which is capable of preventing generation of a scratch in a rear end portion of a rear wing by preventing friction between the rear wing and a knob, thereby avoiding appearance degradation caused by the scratch.

In addition, the present invention provides a wing knob device for an air vent, which minimizes a shake caused by a gap between a rear wing and a knob and solves confusion and inconvenience of a user by providing a clear sense of operation in a closing operation of a rear wing.

The objects of the present invention are not limited thereto, and other objects not mentioned will be clearly understood to those of ordinary skill in the art from the following description.

According to the present invention, a wing knob device for an air vent, which is installed in any one of a plurality of rear wings to change an angle of a rear wing and a front wing, includes a rear knob provided to surround an exterior of the rear wing and comprising a wing inserting portion opened forward to move in a longitudinal direction of the rear wing, a front knob coupled to a front end portion of the rear knob to support a front surface of the rear wing, and an anti-scratch structure provided between the rear wing and the front knob to limit forward/backward movement.

Herein, the anti-scratch structure may include an anti-scratch protrusion provided in an end portion of a protruding portion formed protruding to face both side surfaces of the rear wing in a rear end portion of the front knob, and formed protruding toward the rear wing from the protruding portion to support the rear wing and an auxiliary guide groove formed depressed in a long shape in the longitudinal direction in the rear wing, allowing the anti-scratch protrusion to be inserted thereinto to move in the longitudinal direction, and limiting forward/backward movement of the anti-scratch protrusion.

The auxiliary guide groove may include a friction reducing portion formed protruding from a bottom surface and both ends in the longitudinal direction to support the anti-scratch protrusion.

The wing inserting portion may include a recessed groove portion formed depressed to allow the protruding portion to be inserted thereinto on both inner surfaces facing each other.

The rear wing may include an assembly groove formed gradually depressed toward a front end portion from a position adjacent to the auxiliary guide groove on both side surfaces so as to be opened forward, and guiding insertion of the anti-scratch protrusion into the auxiliary guide groove.

The wing knob device may further include a guide structure provided between the rear wing and the front knob to guide longitudinal movement of the rear knob and the front knob.

The guide structure may include a guide groove in a long shape in the longitudinal direction formed depressed in a front surface of the rear wing and a guide portion formed protruding backward from the front knob and moving by being inserted into the guide groove.

The guide structure may further include a stopper formed in a protruding guide groove formed depressed in a longitudinal side of the guide groove and formed protruding in a position separated from an end portion of the protruding guide groove and a locking end portion formed in an end portion of an engaging protrusion formed protruding from the guide portion and inserted into the protrusion guide groove, and formed protruding backward from the end portion of the engaging protrusion and lockedly engaged to the stopper.

The rear knob may include a first coupling portion in the form of a hole formed in a front end portion surrounding the front knob, and the front knob may include a first engaging portion in the form of a protrusion locked engaged to the first coupling portion.

The rear knob may include a second coupling portion in the form of a hook protruding forward from an inside of a depressed portion formed depressed in the front end portion, and the front knob may include an engaging block inserted into the depressed portion, and a second engaging portion in the form of a hole formed to pass therethrough the second coupling portion in a forward/backward direction so as to be lockedly engaged to the front end portion after being inserted into the engaging block.

The rear knob may include a third coupling portion in the form of a protrusion formed in a front end portion surrounding the front knob, and the front knob may include a third engaging portion formed depressed in a face facing the rear knob so as to allow the third coupling portion to be lockedly engaged thereto.

The wing knob device may further include a knob rubber nested by being inserted into a rubber inserting portion formed depressed in an inner surface of a wing inserting portion of the rear knob and engaged to the rear knob, and supporting a rear end portion of the rear wing.

The wing knob device may further include a decoration portion engaged to the rear knob to cover the rear end portion of the rear knob.

The wing inserting portion may include a protruding support portion protruding from inner side surfaces facing each other to support both side surfaces of the rear wing.

DETAILED DESCRIPTION OF THE INVENTION

Figure 1:
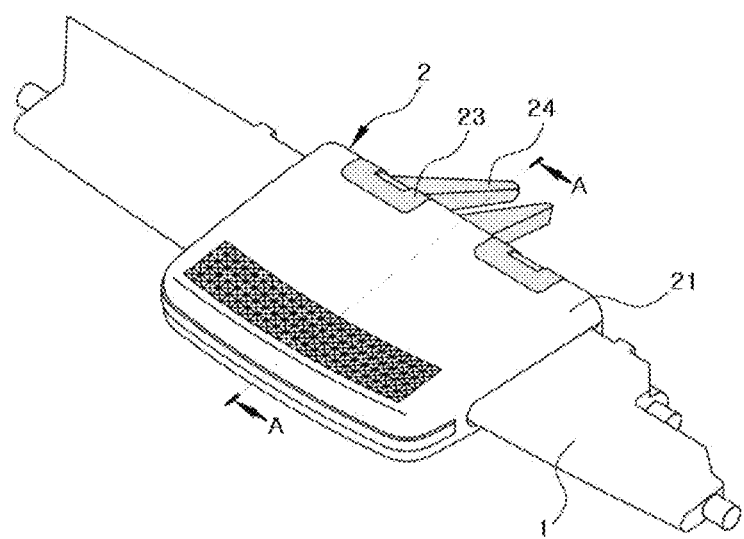
FIG. 1 is a perspective view showing a wing knob device according to a conventional example.
Figure 2:
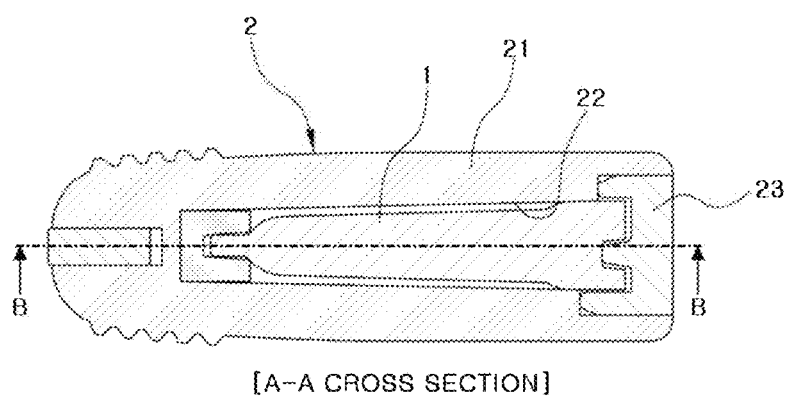
FIG. 2 is a cross-sectional view taken along lines A-A and B-B of FIG. 1.
Figure 3:
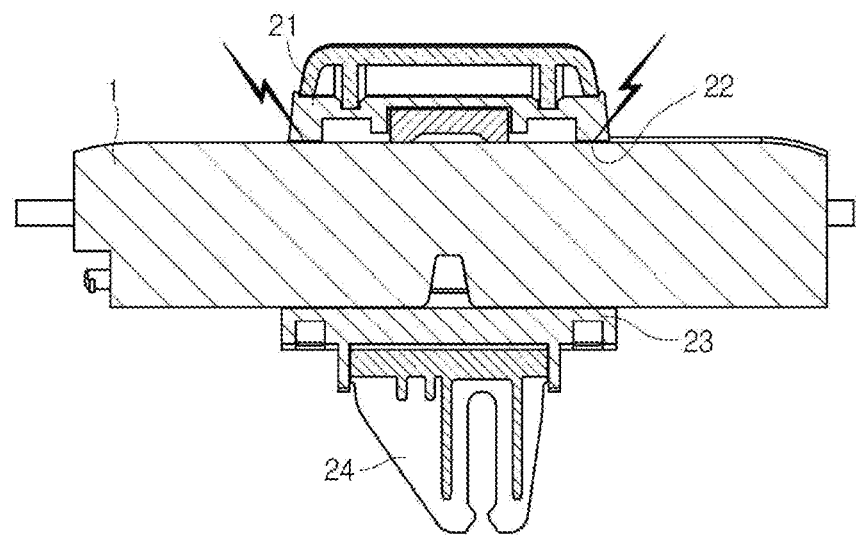
FIG. 3 is a cross-sectional view taken along line B-B of FIG. 2.

Hereinafter, some embodiments of the present invention will be described in detail with reference to the exemplary drawings. In adding reference numerals to components of each drawing, it should be noted that the same components are given the same reference numerals even though they are indicated in different drawings. When the present invention is described, a detailed description of related well-known configurations or techniques will be omitted if it obscures the subject matter of the present invention.

Figure 4:
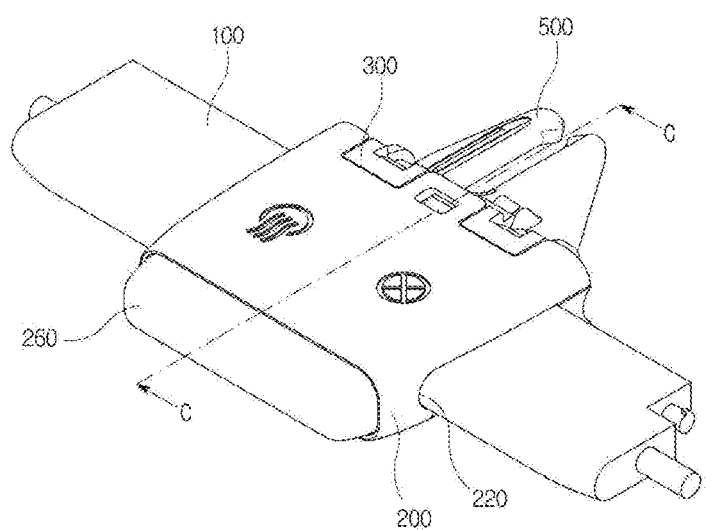
FIG. 4 is a perspective view of a wing knob device for an air vent according to an embodiment of the present invention.
Figure 5:
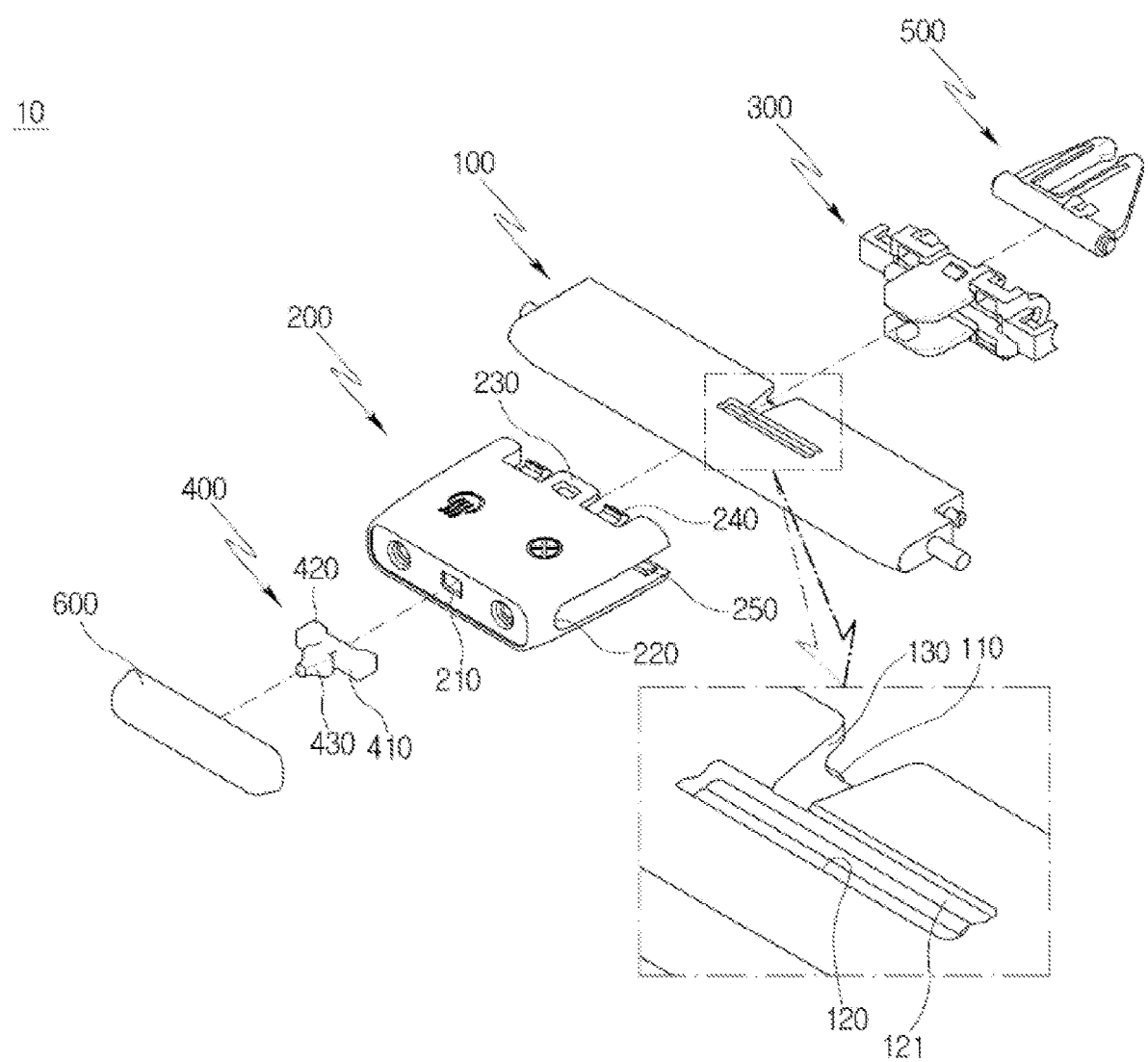
FIG. 5 is an exploded perspective view of a wing knob device for an air vent according to an embodiment of the present invention.
Figure 6:
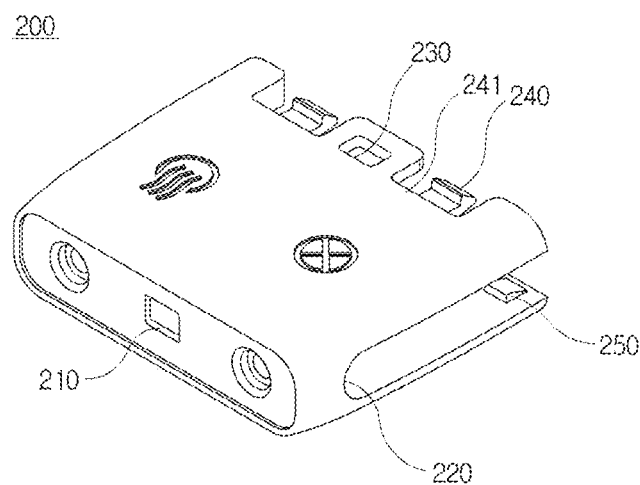
FIGS. 6 and 7 are perspective views of a rear knob of a wing knob device for an air vent according to an embodiment of the present invention.
Figure 7:
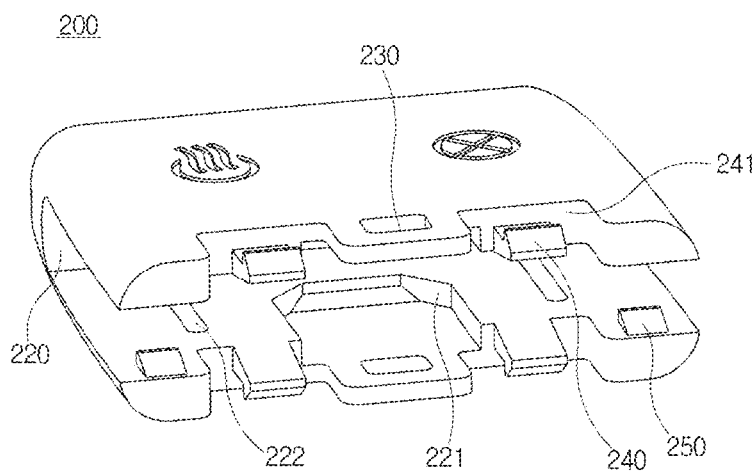
Figure 8:
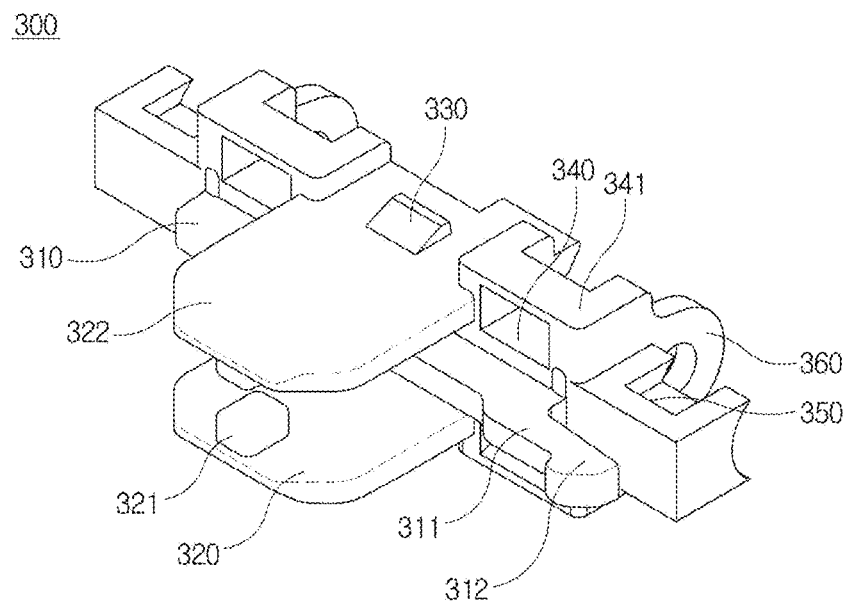
FIG. 8 is a perspective view of a front knob of a wing knob device for an air vent according to an embodiment of the present invention.
Figure 9:
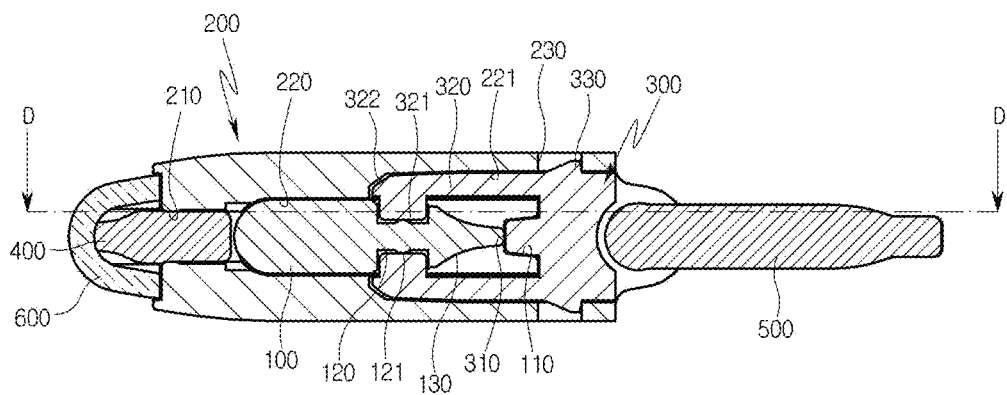
FIG. 9 is a cross-sectional view taken along line C-C of FIG. 4.
Figure 10:
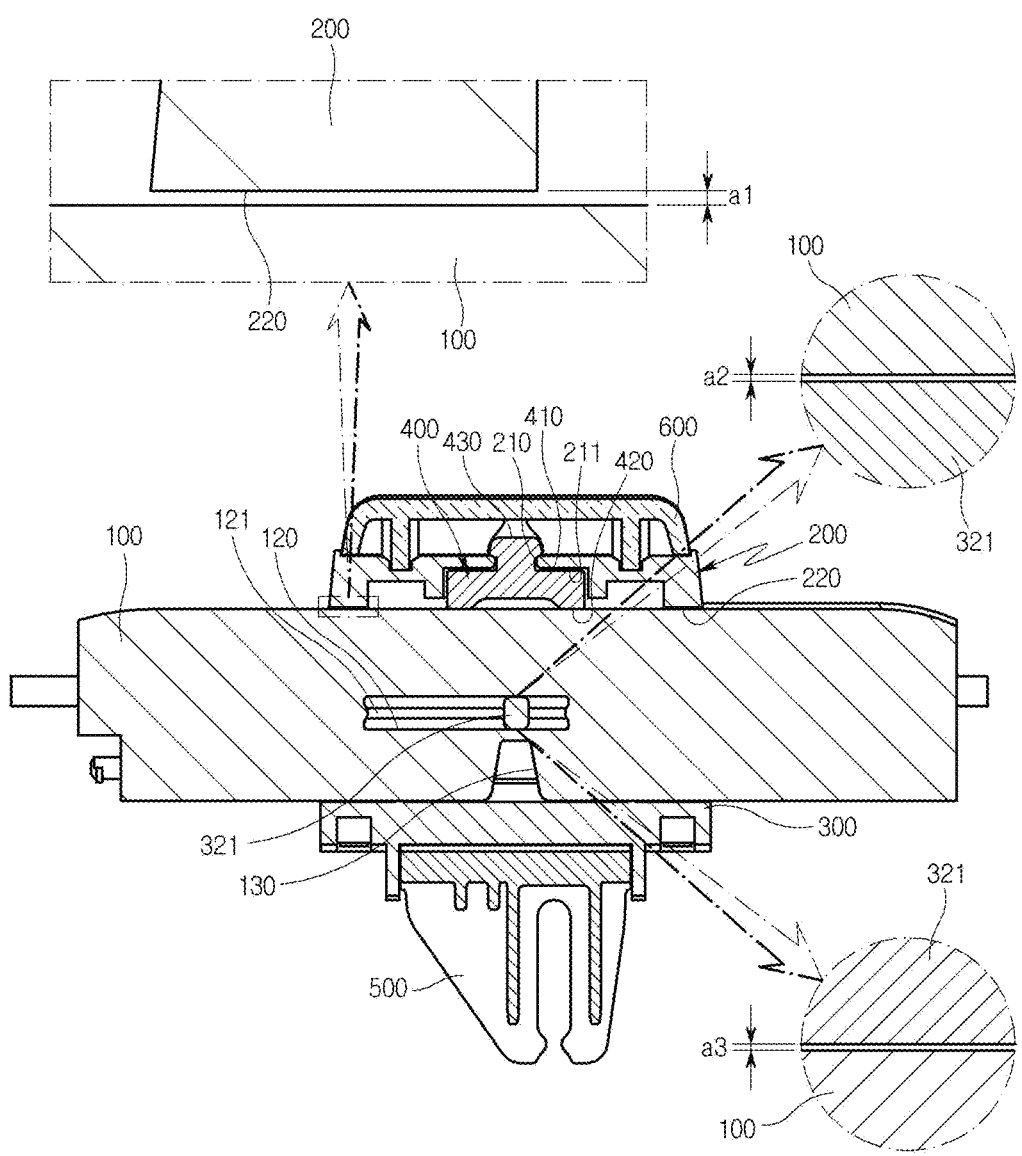
FIG. 10 is a cross-sectional view taken along line D-D of FIG. 9.
Figure 11:
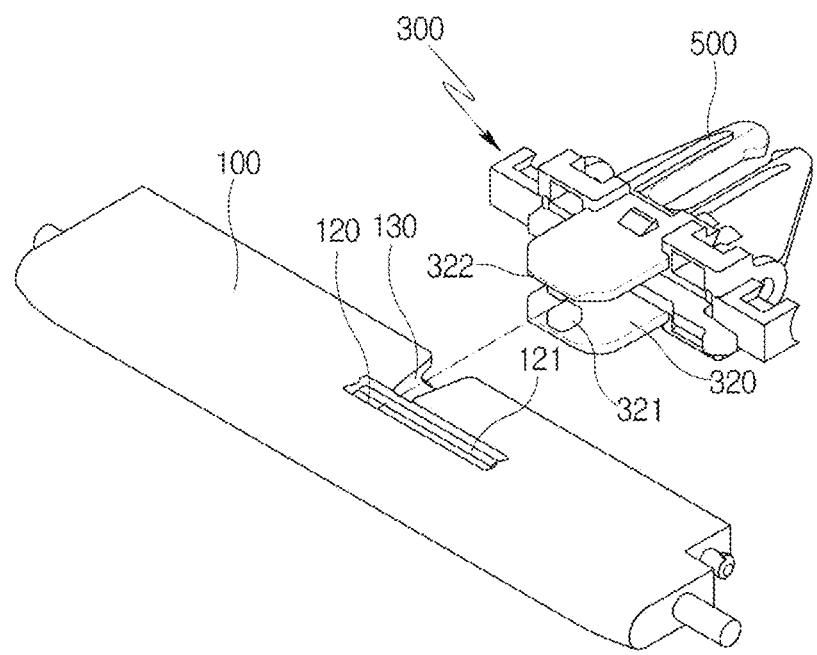
FIGS. 11, 12A, 12B and 12C are views showing a process in which a front knob is assembled to a rear wing during an assembly process of a wing knob device for an air vent according to an embodiment of the present invention.
Figure 12A:
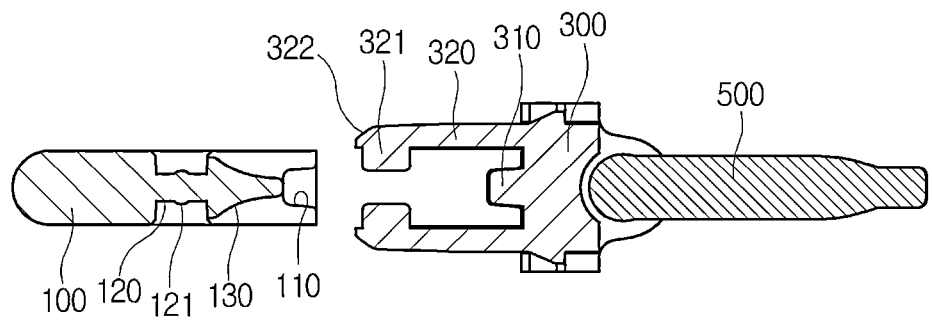
Figure 12B:
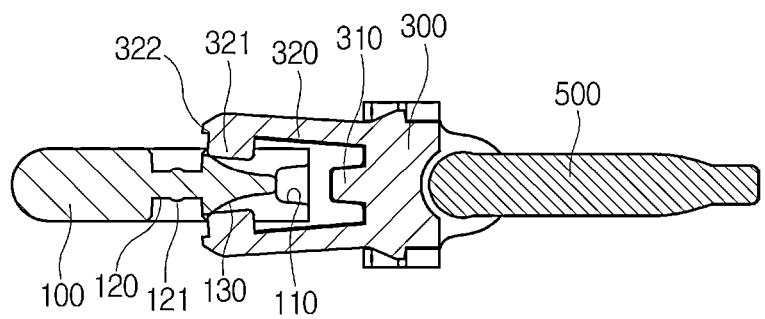
Figure 12C:
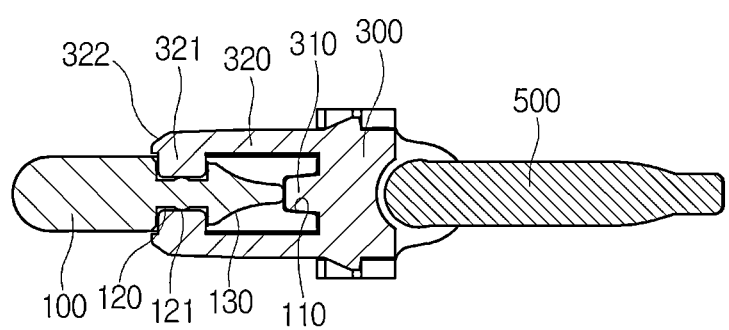
Figure 13:
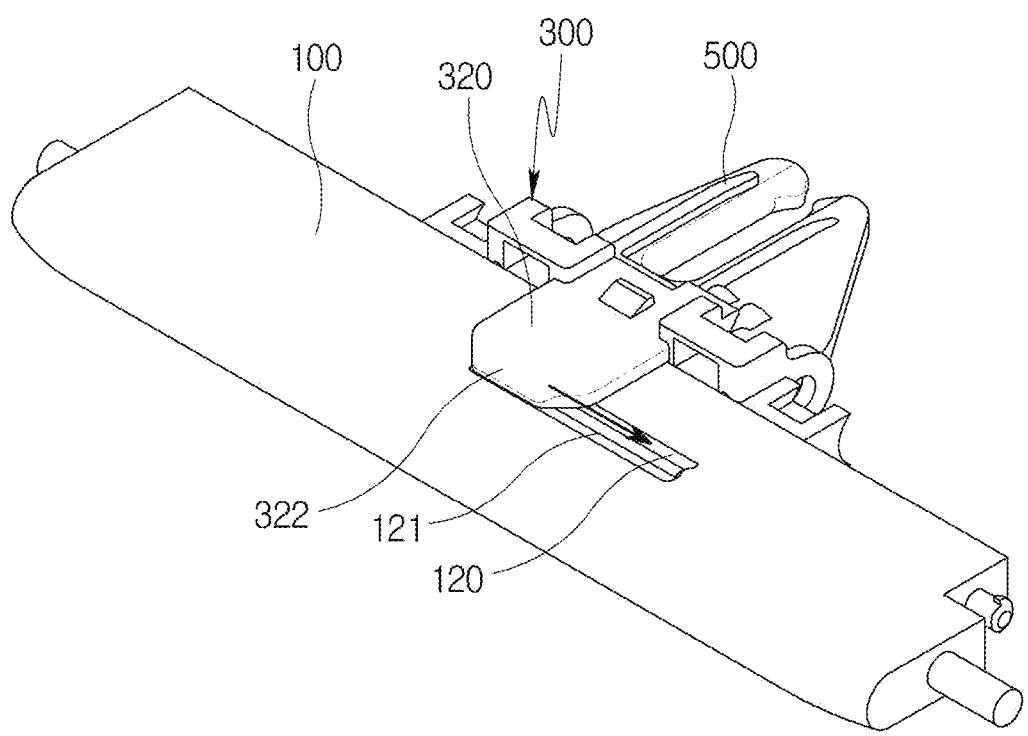
FIGS. 13, 14A and 14B are views showing a process in which a front knob is temporarily cradled on a rear wing during an assembly process of a wing knob device for an air vent according to an embodiment of the present invention.
Figure 14A:
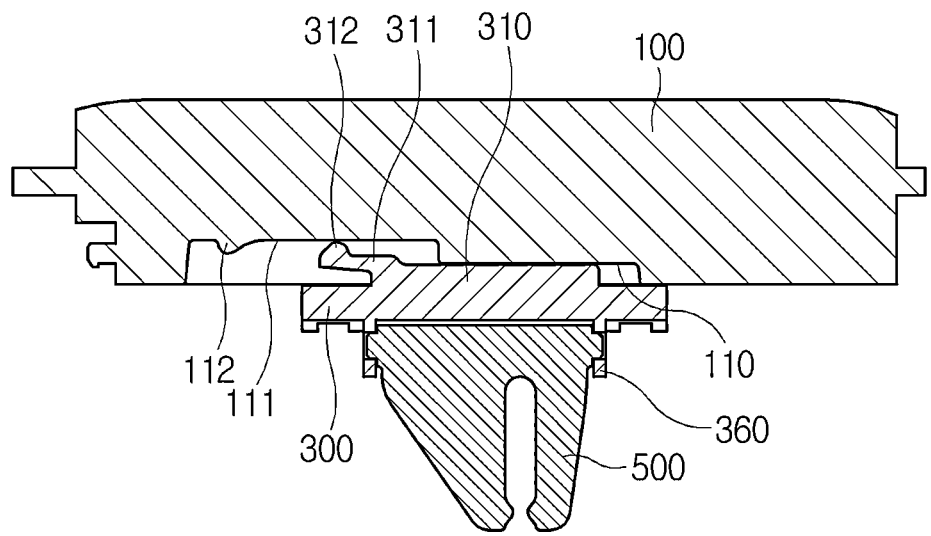
Figure 14B:
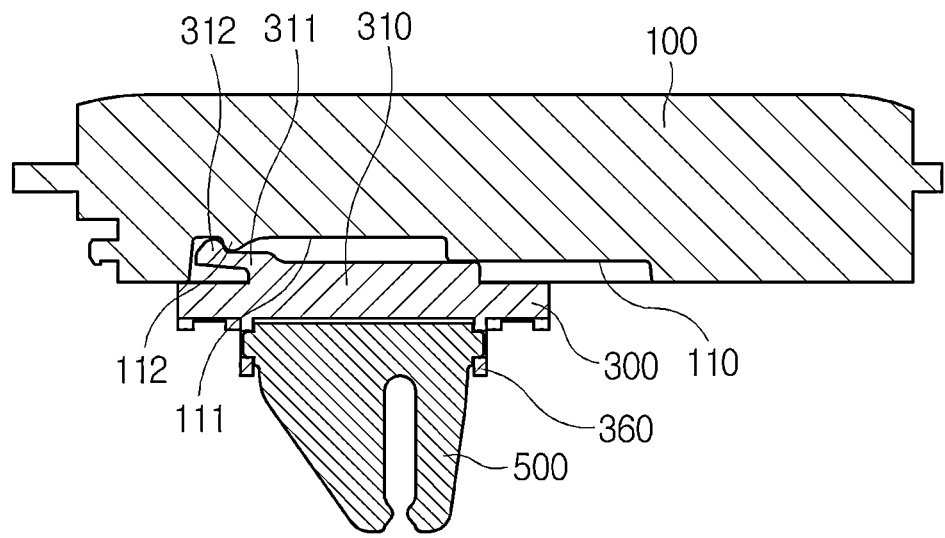
Figure 15:
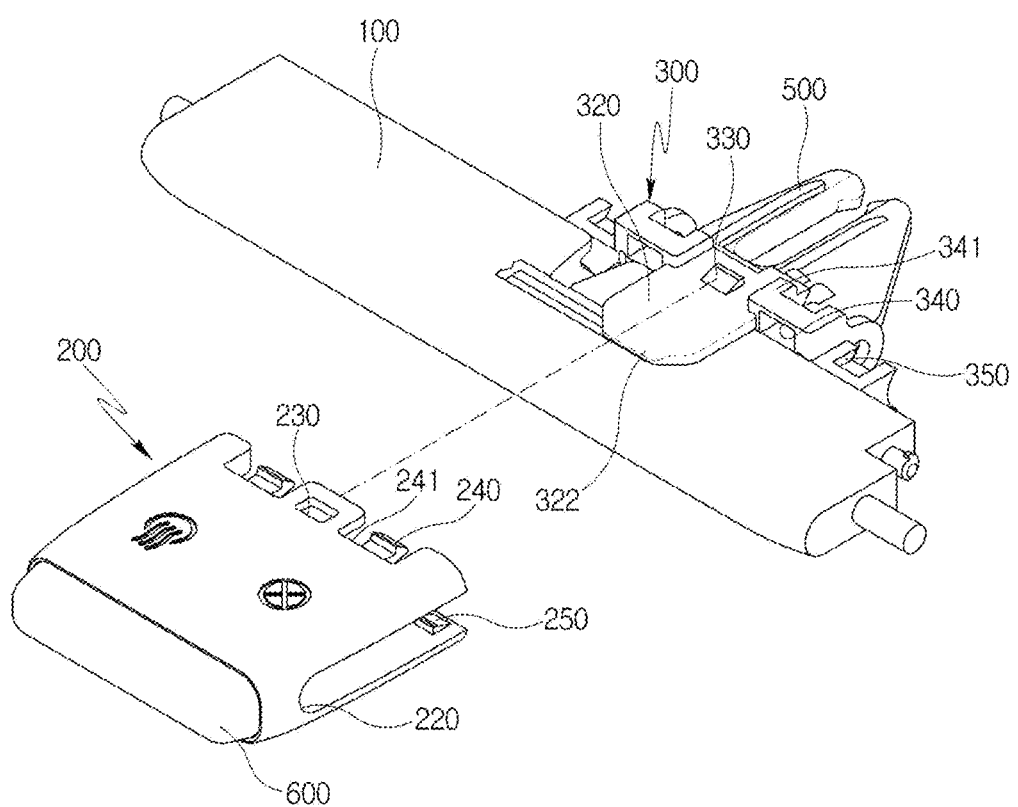
FIGS. 15, 16A and 16B are views showing a process in which a rear knob is assembled to a rear wing on which a front knob is temporarily cradled, during an assembly process of a wing knob device for an air vent according to an embodiment of the present invention.
Figure 16A:
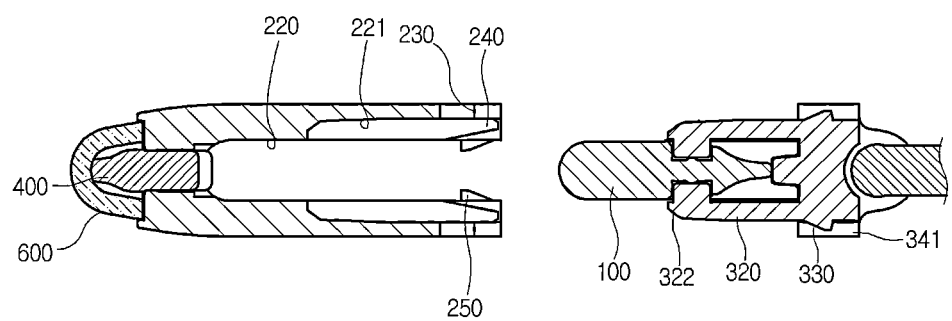
Figure 16B:
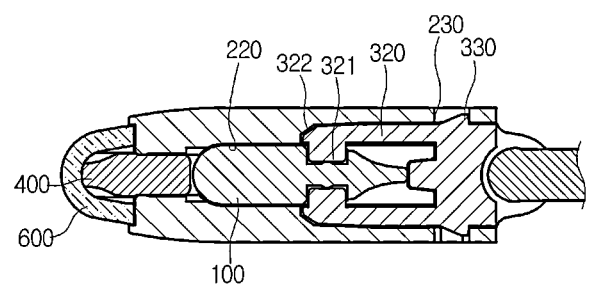

FIG. 4 is a perspective view of a wing knob device for an air vent according to an embodiment of the present invention, FIG. 5 is an exploded perspective view of a wing knob device for an air vent according to an embodiment of the present invention, FIGS. 6 and 7 are perspective views of a rear knob of a wing knob device for an air vent according to an embodiment of the present invention, FIG. 8 is a perspective view of a front knob of a wing knob device for an air vent according to an embodiment of the present invention, FIG. 9 is a cross-sectional view taken along line C-C of FIG. 4, FIG. 10 is a cross-sectional view taken along line D-D of FIG. 9, FIGS. 11, 12A, 12B and 12C are views showing a process in which a front knob is assembled to a rear wing during an assembly process of a wing knob device for an air vent according to an embodiment of the present invention, FIGS. 13, 14A and 14B are views showing a process in which a front knob is temporarily cradled on a rear wing during an assembly process of a wing knob device for an air vent according to an embodiment of the present invention, and FIGS. 15, 16A and 16B are views showing a process in which a rear knob is assembled to a rear wing on which a front knob is temporarily cradled, during an assembly process of a wing knob device for an air vent according to an embodiment of the present invention.

As shown in the drawings, a wing knob device 10 for an air vent according to an embodiment of the present invention installed in any one of a plurality of rear wings 100 to change angles of a rear wing 100 and a front wing (not shown) may include a rear knob 200 provided to surround an outer side of the rear wing 100 and including a wing inserting portion 220 opened forward to move in a longitudinal direction of the rear wing 100, a front knob 300 coupled to a front end portion of the rear knob 200 to support a front surface of the rear wing 100, and an anti-scratch structure provided between the rear wing 100 and the front knob 300 to limit forward and backward movement of the rear wing 100.

The wing knob device 10 for an air vent according to the present invention may be installed in an air vent for a vehicle, and the air vent for the vehicle is mainly applied to a cooling/heating device to introduce a cooling/heating airflow generated from an air conditioner or a heater into a vehicle compartment, and is installed in an end portion of the duct toward the vehicle compartment through which the airflow flows.

Generally, the air vent includes a casing forming a body, the rear wing 100 hinge-coupled to the inside of the casing in a horizontal direction to change a blowing direction up and down, and a front wing hinge-coupled to the inside of the casing in a vertical direction to change the blowing direction left and right.

The wing knob device 10 for the air vent, which includes the rear knob 200 and the front knob 300, may be coupled to an outer side of any one of the plurality of rear wings 100 to change angles of the rear wing 100 and the front wing.

The rear wing 100 may be provided in the form of a plate formed long approximately in a longitudinal direction, and may include a hinge shaft at both ends in the longitudinal direction to be hinge-coupled to a frame.

The rear knob 200 may be disposed in the rear side of the rear wing 100, may include the wing inserting portion 220 provided to surround a part of an outer side of the rear wing 100 and opened forward, and may be coupled to the front knob 300 to be described below to move in the longitudinal direction of the rear wing 100 together with the front knob 300.

The wing inserting portion 220 may be formed depressed in a shape corresponding to the rear wing 100 in a front end portion of the rear knob 200 such that the rear wing 100 is inserted to the front of the rear knob 200, and may be opened to both sides in the longitudinal direction to allow the rear wing 100 to pass therethrough.

The wing inserting portion 220 may include a protruding support portion 222 that protrudes from both inner surfaces facing each other to support both side surfaces of the rear wing 100.

The protruding support portion 222 may be formed to protrude convexly and formed long in the forward/backward direction, and as the both side surfaces of the rear wing 100 are supported, friction with the rear wing 100 may be minimized and a sense of operation may be improved, during movement of the rear knob 200.

The rear knob 200 may include a decoration portion 600 covering a rear end portion, and a rubber inserting portion 211 depressed in the wing inserting portion 220 to allow the knob rubber 400 to be inserted thereinto.

The decoration portion 600 may improve the appearance by covering the rear end portion of the rear knob 200, and may be provided at the rear in the shape of a convex cap to be engaged with the rear of the rear knob 200.

The knob rubber 400 may be provided for a uniform sense of operation of the rear knob 200, and may be inserted into the rubber inserting portion 211 formed depressed in an inner surface of the wing inserting portion 220 of the rear knob 200 to support the rear end portion of the rear wing 100.

That is, the knob rubber 400 may include a knob support surface 410 supporting the rear knob 200 in the rear end portion, and a wing support portion 420 in the front end portion to support the rear wing 100 in the forward direction by overlapping the rear end portion of the rear wing 100.

The knob rubber 400 may include a decoration portion support portion 430 formed to protrude in the center of the rear end portion. As the decoration portion support portion 430 supports the inner surface of the decoration portion 600 by passing through the rubber coupling hole 210 formed in the rear knob 200, the shape of the decoration portion 600 may be maintained and the support stiffness of the decoration portion 600 may be improved.

The front knob 300 may be disposed in front of the rear wing 100, and the front end portion of the rear knob 200 may be coupled to support the front surface of the rear wing 100.

The front knob 300 may include a hinge portion 360 hinge-connected to a knob finger 500 connected to the front wing, and the front knob 300 may be hinge-rotated with the knob finger 500 when rotating up and down together with the rear wing 100.

In addition, when the rear knob 200 and the front knob 300 move left and right in the longitudinal direction, the knob finger 500 may move together to adjust the angle of the front wing, and when the rear knob 200 and the front knob 300 are moved to a side end in the longitudinal direction, the front wing may be closed, thus closing the air vent.

In the wing knob device 10 for the air vent may be provided a guide structure for guiding longitudinal movement and an anti-scratch structure for guiding longitudinal movement of the rear knob 200 while preventing friction between the rear wing 100 and the rear knob 200.

The anti-scratch structure may be provided between the rear wing 100 and the front knob 300 to limit forward and backward movement of the rear wing 100, and even when an external force is applied forward to the rear knob 200, front movement of the rear knob 200 may be limited to prevent friction with the rear wing 100.

The anti-scratch structure may include an anti-scratch protrusion 321 provided in the front knob 300 and an auxiliary guide groove 120 provided in the rear wing 100.

The anti-scratch protrusion 321 may be provided in an end portion of the protruding portion 320 formed to protrude facing both side surfaces of the rear wing 100 in the rear end portion of the front knob 300, and may be inserted into the auxiliary guide groove 120 formed protruding toward the rear wing 100 in the end portion of the protruding portion 320 and described below to support the rear wing 100.

The anti-scratch protrusion 321 may be formed in the shape of a plane where a front end cross-section and a rear end cross-section oppose an inner surface of the auxiliary guide groove 120.

Herein, the wing inserting portion 220 of the rear knob 200 may include a recessed groove portion 221 formed depressed to allow the protruding portion 320 to be inserted in both inner surfaces facing each other, and when the rear knob 200 is coupled to the front knob 300, the protruding portion 320 may be inserted into the recessed groove portion 221.

The auxiliary guide groove 120 may be formed depressed in the rear wing 100 in a longitudinally long shape, and may be provided to allow the anti-scratch protrusion 321 to be inserted thereinto to move in the longitudinal direction.

The auxiliary guide groove 120 may form a specific gap with the anti-scratch protrusion 321 in the forward/backward direction to limit forward and backward movement of the anti-scratch protrusion 321.

In particular, the auxiliary guide groove 120 may form a specific gap for smooth movement of the anti-scratch protrusion 321, such that the gap is less than a gap a1 between the rear knob 200 and the rear wing 100 in the forward/backward direction, thereby preventing friction between the rear wing 100 and the rear knob 200.

The rear wing 100 maintains a close contact state with the front knob 300 due to the knob rubber 400 supporting forward, and a rear end portion thereof has a predetermined gap a1 with an inner point of the wing inserting portion 220 of the rear knob 200.

The anti-scratch protrusion 321 may have a gap with the auxiliary guide groove 120 in the forward/backward direction, in which the gap is a specific gap (a2+a3) that is a sum of a gap a2 between a front end cross-section of the anti-scratch protrusion 321 and the auxiliary guide groove 120 and a gap a3 between a rear end cross-section of the anti-scratch protrusion 321 and the auxiliary guide groove 120, and such a gap (a2+a3) is less than the gap a1 between the rear knob 200 and the rear wing 100 in the forward/backward direction.

As the anti-scratch structure is provided, the rear knob 200 and the front knob 300 may smoothly move by being guided left and right in the longitudinal direction of the rear wing 100, while limiting forward and backward movement, thereby preventing friction between the rear knob 200 and the rear wing 100.

In this case, to minimize friction with the auxiliary guide groove 120 when the anti-scratch protrusion 321 moves along the auxiliary guide groove 120, the auxiliary guide groove 120 may include a friction reducing portion 121 formed to protrude on a bottom surface and both ends in the longitudinal direction to support the anti-scratch protrusion 321.

The friction reducing portion 121 may be provided in the form of a protruding rib connected from a side end in the longitudinal direction to the other side end in the longitudinal direction along a bottom surface, in which a protruding end portion is formed convexly to minimize the area of friction with the anti-scratch protrusion 321.

The rear wing 100 may include an assembly groove 130 formed depressed to a position adjacent to the guide groove 110 from a front end portion such that the anti-scratch protrusion 321 may be easily inserted into the auxiliary guide groove 120 for assembly when the front knob 300 is assembled.

As the assembly groove 130 is formed gradually depressed from the position adjacent to the auxiliary guide groove 120 toward the front end portion on both side surfaces of the rear wing 100 so as to be opened forward, the anti-scratch protrusion 321 is inserted through the front opened portion of the assembly groove 130 when the front knob 300 is assembled to the rear wing 100, and then the anti-scratch protrusion 321 moves along the assembly groove 130 to be easily inserted into a side of the auxiliary guide groove 120.

Such an assembly groove 130 may be formed depressed in both side surfaces of the rear wing 100 in such a way to be gradually depressed from a side of the auxiliary guide groove 120 toward the front end portion of the rear wing 100, and guide insertion of the anti-scratch protrusion 321 into the auxiliary guide groove 120.

That is, a pair of anti-scratch protrusions 321 are inserted into the assembly groove 130 and then move along a bottom surface of the assembly groove 130, in which the pair of anti-scratch protrusions 321 are spaced apart from each other as the protruding portion 320 is elastically deformed toward the auxiliary guide groove 120, and after the pair of anti-scratch protrusions 321 are respectively inserted into the auxiliary guide grooves 120, the protruding portion 320 is reconstructed and is supported on an inner surface of the auxiliary guide groove 120. Thus, the anti-scratch protrusion 321 may not leave the auxiliary guide groove 120 in any position thereof, and may be easily assembled to the auxiliary guide groove 120 through the assembly groove 130.

The guide structure may be provided between the front end portion of the rear wing 100 and the front knob 300 to guide left and right movement of the rear knob 200 and the front knob 300 in the longitudinal direction, and may include the guide groove 110 and a guide portion 310.

The guide groove 110 may be formed depressed in the front surface of the rear wing 100 long in the longitudinal direction, and may move in the longitudinal direction, having the guide portion 310 inserted thereinto.

The guide portion 310 may be formed to protrude backward from the front knob 300, may be inserted into the guide groove 110, may move in the longitudinal direction in the guide groove 110, and support a space between the rear wing 100 and the front knob 300.

In such a guide structure, a front end portion of the assembly groove 130 may be positioned in a longitudinal side of the guide groove 110, and a temporary cradle structure with the guide portion 130 may be provided in the other longitudinal side of the guide groove 110.

The guide groove 110 may include a protrusion guide groove 111 formed depressed long in the longitudinal direction on an opposite side where the assembly groove 130 in the longitudinal direction is positioned, and a stopper 112 formed to protrude in a position separated from an end portion of the protrusion guide groove 111.

The guide portion 310 may include an engaging protrusion 311 formed protruding so as to be inserted into the protrusion guide groove 111, and a locking end portion 312 formed in an end portion of the engaging protrusion 311 and formed protruding to the rear from the end portion of the engaging protrusion 311 so as to be lockedly-engaged to the stopper 112.

The engaging protrusion 311 may be formed protruding from the other side end of the guide portion 310 in the longitudinal direction to the other side so as to protrude toward the bottom surface of the guide groove 110 in a direction to the other side, and may include the locking end portion 312 formed protruding from the other side end toward the bottom surface of the guide groove 110.

The locking end portion 312 may move along the protrusion guide groove 111 when the guide portion 310 moves left and right in the longitudinal direction along the guide groove 110, and when the locking end portion 312 moves to the other side end in the longitudinal direction, the locking end portion 312 temporarily cradled on the other side end of the protrusion guide groove 111 by being locked by the stopper 112.

Such a temporary cradling structure of the front knob 300 of the rear wing 100 may limit left and right movement in the forward/backward direction and in the longitudinal direction for a position of the front knob 300 when the rear knob 200 is assembled after assembly of the front knob 300 to the rear wing 100, thereby facilitating assembly of the rear knob 200 and providing a clear sense of operation in a closing operating of the front wing.

Hereinbelow, a coupling structure between the rear knob 200 and the front knob 300 will be described.

First, the rear knob 200 may include a pair of first coupling portions 230 formed in the form of a rectangular hole in a front end portion surrounding a central portion of both side surfaces of the front knob 300.

The front knob 300 may include a pair of first engaging portions 330 formed in the shape of protrusions on both side surfaces so as to be lockedly engaged to the pair of first coupling portions 230.

The first engaging portion 330 may be provided in the form of a protrusion gradually protruding forward, and may include in a front end portion thereof, a support surface in the shape of a plane inserted into and supported by the first coupling portion 230.

The rear knob 200 may include four depressed portions 241 formed depressed in both sides of the first coupling portion 230 of the front end portion so as to allow an engaging block 341 to be inserted thereinto, and four second coupling portions 240 in the form of hooks protruding forward from the inside of the depressed portion 241.

However, the second coupling portion 240 may be formed protruding to be opened outward in a forward direction and may include in a protruding end portion, a locking protrusion engaged to the second engaging portion 340.

The locking protrusion may have an inclined surface formed in the front end portion and a step surface stepped from the second coupling portion 240 formed in the rear end portion to facilitate insertion of the engaging block 341, after which the step surface may support the front end portion of the engaging block 341, thus being lockedly engaged.

The front knob 300 may include four engaging blocks 341 respectively inserted into four depressed portions 241, and may include the second engaging portion 340 in the form of a hole formed through the engaging blocks 341 in the forward/backward direction to allow the second coupling portion 240 to be inserted thereinto and then lockedly engaged to the front end portion.

The rear knob 200 may include a third coupling portion 250 in the form of a protrusion formed in four front end portions surrounding both sides in the longitudinal direction on both side surfaces of the front knob 300.

The third coupling portion 250 may have an inclined surface in the front end portion and a step surface lockedly engaged to the third engaging portion 350 in the rear end portion.

The front knob 300 may include four third engaging portions 350 formed depressed on a surface facing the rear knob 200 to allow the four third coupling portions 250 to be lockedly engaged thereto.

Thus, when the rear wing 100 engaged to the front knob 300 and the rear knob 200 are assembled, the rear knob 200 may move forward and, as the first coupling portion 230, the second coupling portion 240, and the third coupling portion 250 are respectively coupled to the first engaging portion 330, the second engaging portion 340, and the third engaging portion 350 after the rear wing 100 is inserted into the wing inserting portion 220, the rear knob 200 and the front knob 300 are coupled.

In this case, as the inclined surface is formed in the first engaging portion 330, the second coupling portion 240 is formed inclinedly, the inclined surface is formed in the locking protrusion, and the inclined surface is formed in the third coupling portion 250, assembly may be guided in forward movement of the rear knob 200, the support surface of the first engaging portion 330 may be supported in the first coupling portion 230, the locking protrusion of the second coupling portion 240 may be lockedly engaged to the second engaging portion 340, and the step surface of the third coupling portion 250 may be lockedly engaged to the third engaging portion 350, thus completing assembly of the rear knob 200 and the front knob 300.

Hereinbelow, a method for assembling the wing knob device 10 for an air vent will be described with reference to FIGS. 11 to 16B.

First, a preparation operation may include the rear wing 100, the rear knob 200 having the knob rubber 400 and the decoration portion 600 mounted thereon, and the front knob 300 having the knob finger 500 mounted thereon.

Next, an operation of assembling the rear wing 100 and the front knob 300 may include a primary assembly process of inserting the anti-scratch protrusion 321 into the auxiliary guide groove 120 and a secondary assembly process of temporarily cradling the front knob 300 on the rear wing 100.

In the primary assembly process of inserting the anti-scratch protrusion 321 into the auxiliary guide groove 120, as shown in FIG. 11, as the front knob 300 moves toward the rear wing 100, the anti-scratch protrusion 321 may be inserted into the assembly groove 130 and the guided to be inserted into a longitudinal side of the auxiliary guide groove 120. At the same time, the guide portion 310 and the engaging protrusion 311 formed in the rear side of the front knob 300 may be respectively inserted into the guide groove 110 and the protrusion guide groove 111 formed in the front of the rear wing 100.

Hereinbelow, a process in which the anti-scratch protrusion 321 is inserted into the auxiliary guide groove 120 will be described with reference to FIGS. 12A and 12B.

FIGS. 12A and 12B show a cross-section of a portion where the assembly groove 130 of the rear wing 100 is formed and a cross-section of a portion where the anti-scratch protrusion 321 of the front knob 300 is formed.

As shown in FIG. 12A, the assembly grooves 130 may be respectively formed on both side surfaces in the rear wing 100 such that a thickness of the assembly groove 130 decreases toward the front end portion, and the front knob 300 may include a pair of protruding portions 320 facing each other and a pair of anti-scratch protrusions 321 formed protruding inward to face each other in the protruding end portions of the protruding portions 320.

As shown in FIG. 12B, the front knob 300 may move backward as the pair of anti-scratch protrusions 321 are inserted into the assembly groove 130, the pair of anti-scratch protrusions 321 are opened as they move along the bottom surface of the assembly groove 130, and the protruding portions 320 are elastically deformed outwardly.

As such, when the anti-scratch protrusion 321 moving along the bottom surface of the assembly groove 130 is inserted into the auxiliary guide groove 120 as shown in FIG. 12C, the protruding portion 320 may support a state of the anti-scratch protrusions 321 being inserted into the auxiliary guide groove 120 due to recovery of the elastic deformation.

The assembly groove 130 is not formed connected to the auxiliary groove 120, but is formed gradually depressed toward the front end portion of the rear wing 100 to guide the anti-scratch protrusion 321, such that after the anti-scratch protrusion 321 is inserted into the auxiliary guide groove 120 along the assembly groove 130, the anti-scratch protrusion 321 may not leave again the auxiliary guide groove 120 through the assembly groove 130.

In the secondary assembly process of temporarily cradling the front knob 300 on the rear wing 100, as shown in FIG. 13, after the front knob 300 moves from a longitudinal side to the other longitudinal side along the auxiliary guide groove 120 of the rear wing 100, the engaging protrusion 311 may is temporarily cradled in the end portion of the protrusion guide groove 111.

The locking end portion 312 of the engaging protrusion 311 may be lockedly engaged in the stopper 112 formed in a position separated from the end portion of the protrusion guide groove 111 so as to be positioned between the end portion of the protrusion guide groove 111 and the stopper 112, thus being temporarily cradled.

Hereinbelow, the secondary assembly process of temporarily cradling the front knob 300 on the rear wing 100 will be described in more detail with reference to FIGS. 14A and 14B.

FIG. 14A shows a state where the primary assembly process of inserting the anti-scratch protrusion 321 into the auxiliary guide groove 120 is performed such that the guide portion 310 is inserted into the guide groove 110 and the engaging protrusion 311 is inserted into the protrusion guide groove 111. In this case, the locking end portion 312 of the engaging protrusion 311 support the bottom surface of the protrusion guide groove 111.

Next, when the front knob 300 moves to the other side end in the longitudinal direction along the auxiliary guide groove 120 of the rear wing 100, the locking end portion 312 of the engaging protrusion 311 may be lockedly engaged in the stopper 112 and may be positioned in the end portion of the protrusion guide groove 111, as shown in FIG. 14B.

When the locking end portion 312 is lockedly engaged to the stopper 112 as the front knob 300 moves to the other side end in the longitudinal direction along the auxiliary guide groove 120 of the rear wing 100, a clear sense of operation may be provided to the user.

Moreover, when the user moves the rear knob 200 and the front knob 300 to the other side end in the longitudinal direction while the user holding the rear end of the rear knob 200 after assembly of the wing knob device 10 for the air vent is completed, the front wing is closed and the locking end portion 312 is lockedly engaged to the stopper 112, thus providing a clear sense of operation to the user, and that is, locked engagement of the locking end portion 312 and the stopper 112 may provide the clear sense of operation to the user at a time when the front wing is closed and at a time when the front wing is opened again, such that the user may clearly recognize the closing operation of the front wing.

Next, as shown in FIG. 15, an assembly stage of the rear knob 200 and the front knob 300 is performed, and in this stage, the rear knob 200 may move forward and thus may be engaged to the front knob 300, in which the first coupling portion 230, the second coupling portion 240, and the third coupling portion 250 of the rear knob 200 may be lockedly engaged to the first engaging portion 330, the second engaging portion 340, and the third engaging portion 350 of the front nob 300, respectively.

FIGS. 16A and 16B show a process in which the first coupling portion 230 of the rear knob 200 and the first engaging portion 330 of the front knob 300 are lockedly engaged.

As shown in FIG. 16A, in the wing inserting portion 220 of the rear knob 200, the recessed groove portion 221 is provided into which the protruding portion 320 of the front knob 300 is inserted, and the first coupling portion 230 in the form of a hole is formed in the center of the front end portion.

In the rear knob 200, the second coupling portion 240 in the form of a hook is formed in the depressed portion 241 formed on both sides of the first coupling portion 230 and the third coupling portion 250 in the form of a protrusion is formed in both side ends of the front end portion.

The front knob 300 may include the first engaging portion 330 formed protruding in the form of a protrusion on both side surfaces so as to be engaged to the first coupling portion 230 in the center thereof, and include an inclined surface guiding the first coupling portion 230 and a support surface in the form of a flat surface lockedly supported by being inserted into the first coupling portion 230.

Then, in the front knob 300, the second engaging portion 340 in the form of a hole to which the second coupling portion 240 is engaged and the third engaging portion 350 in the form of a groove to which the third coupling portion 250 is engaged are respectively provided.

Thus, the rear knob 200 moves forward and thus the front end portion is supported by the inclined surface of the first engaging portion 330, and when the support surface of the first engaging portion 330 is lockedly supported in the first coupling portion 230 as the first engaging portion 330 is lockedly engaged to the first coupling portion 230 as shown in FIG. 16B, the second coupling portion 240 and the third coupling portion 250 may be lockedly engaged to the second engaging portion 340 and the third engaging portion 250 and assembly of the rear knob 200 and the front knob 300 is completed.

In this case, the rear of the rear wing 100 is inserted into the wing inserting portion 220 of the rear knob 200, and the protruding portions 320 of the front knob 300 are inserted into the recessed groove portion 221, and the rear end portion of the rear wing 100 is formed round and the insertion guide surface 322 in the form of an inclined surface is provided at a corner of the rear end portion of the protruding portions 320, thus guiding assembly of the rear knob 200.

According to embodiments of the present invention having such a shape and a structure, by including an anti-scratch structure for limiting movement of a rear wing to prevent friction between a rear wing and a knob, a knob rubber may normally support the rear wing and the rear wing may provide a uniform sense of operation while operating stably.

Moreover, as the anti-scratch structure is provided, friction between the rear wing and the knob may be prevented, thereby preventing generation of a scratch in the rear end portion of the rear wing and thus preventing degradation of the appearance, caused by the scratch, and movement between the rear wing and the knob may be further guided to minimize a shake caused by a gap between the rear wing and the knob, thereby providing an enhanced sense of operation.

Furthermore, by including a temporary cradling structure in a side of the guide structure, the clear sense of operation is provided in the closing operation of the front wing, thereby solving confusion and inconvenience of the user.

In addition, assembly is easy to perform despite including the anti-scratch structure, and the primarily assembled front knob is temporarily cradled to prevent movement in the secondary assembly to the rear knob, thereby facilitating assembly.

That is, conventionally, due to the absence of binding between the rear wing and the knob body, leave or movement of the knob body occurs in knob guide assembly, making the assembly difficult, whereas in the present invention, by providing a temporary cradling structure between the front knob and the rear wing, the front knob may maintain a state of being engaged to the rear wing in rear knob assembly, thus facilitating the assembly.

According to the present invention, by including an anti-scratch structure for limiting movement of a rear wing to prevent friction between a rear wing and a knob, a knob rubber may normally support the rear wing and the rear wing may provide a uniform sense of operation while operating stably.

Moreover, as the anti-scratch structure is provided, friction between the rear wing and the knob may be prevented, thereby preventing generation of a scratch in the rear end portion of the rear wing and thus preventing degradation of the appearance, caused by the scratch, and movement between the rear wing and the knob may be further guided to minimize a shake caused by a gap between the rear wing and the knob, thereby providing an enhanced sense of operation.

Furthermore, by including a temporary cradling structure in a side of the guide structure, the clear sense of operation is provided in the closing operation of the front wing, thereby solving confusion and inconvenience of the user.

In addition, assembly is easy to perform despite including the anti-scratch structure, and the primarily assembled front knob is temporarily cradled to prevent movement in the secondary assembly to the rear knob, thereby facilitating assembly.

That is, conventionally, due to the absence of binding between the rear wing and the knob body, leave or movement of the knob body occurs in knob guide assembly, making the assembly difficult, whereas in the present invention, by providing a temporary cradling structure between the front knob and the rear wing, the front knob may maintain a state of being engaged to the rear wing in rear knob assembly, thus facilitating the assembly.

Even though all components constituting an embodiment of the present invention have been described above as being combined into one or operating in combination, the present invention is not necessarily limited to the embodiment. That is, within the object scope of the present invention, all the components may operate by being selectively combined into one or more.

The above description is merely illustrative of the technical idea of the present invention, and various modifications and variations will be possible without departing from the essential characteristics of the present invention by those of ordinary skill in the art to which the present invention pertains. Therefore, the embodiments disclosed in the present invention are intended for description rather than limitation of the technical spirit of the present invention, and the scope of the technical spirit of the present invention is not limited by these embodiments. The protection scope of the present invention should be interpreted by the following claims, and all technical spirits within the same range should be understood to be included in the range of the present invention.

DESCRIPTION OF REFERENCE NUMERALS

10: WING KNOB DEVICE FOR AIR VENT
100: REAR WING
110: GUIDE GROOVE
111: PROTRUSION GUIDE GROOVE
112: STOPPER
120: AUXILIARY GUIDE GROOVE
121: FRICTION REDUCING PORTION
130: ASSEMBLY GROOVE
200: REAR KNOB
210: RUBBER COUPLING HOLE
211: RUBBER INSERTING PORTION
220: WING INSERTING PORTION
221: RECESSED GROOVE PORTION
222: PROTRUDING SUPPORT PORTION
230: FIRST COUPLING PORTION
240: SECOND COUPLING PORTION
241: DEPRESSED PORTION
250: THIRD COUPLING PORTION
300: FRONT KNOB
310: GUIDE PORTION
311: ENGAGING PROTRUSION
312: LOCKING END PORTION
320: PROTRUDING PORTION
321: SCRATCH PREVENTING PROTRUSION
322: INSERTION GUIDE SURFACE
330: FIRST ENGAGING PORTION
340: SECOND ENGAGING PORTION
341: ENGAGING BLOCK
350: THIRD ENGAGING PORTION
360: HINGE PORTION
400: KNOB RUBBER
410: KNOB SUPPORT SURFACE
420: WING SUPPORT PORTION
430: DECORATION PORTION SUPPORT PORTION
500: KNOB FINGER
600: DECORATION PORTION

What is claimed is:

1. A wing knob device for an air vent, which is installed in any one of a plurality of rear wings to change an angle of a rear wing and a front wing, the wing knob device comprising:
   a rear knob provided to surround an exterior of the rear wing and comprising a wing inserting portion opened forward to move in a longitudinal direction of the rear wing;
   a front knob coupled to a front end portion of the rear knob to support a front surface of the rear wing; and
   an anti-scratch structure provided between the rear wing and the front knob to limit forward/backward movement;
   wherein the anti-scratch structure comprises:
      an anti-scratch protrusion provided in an end portion of a protruding portion formed protruding to face both side surfaces of the rear wing in a rear end portion of the front knob, and formed protruding toward the rear wing from the protruding portion to support the rear wing; and
      an auxiliary guide groove formed depressed in a long shape in the longitudinal direction in the rear wing, allowing the anti-scratch protrusion to be inserted thereinto to move in the longitudinal direction, and limiting forward/backward movement of the anti-scratch protrusion,
      wherein a specific gap between the anti-scratch protrusion and the auxiliary guide groove in the forward/backward direction is less than a gap between the rear knob and the rear wing in the forward/backward direction.

2. The wing knob device of claim 1, wherein the auxiliary guide groove comprises a friction reducing portion formed protruding from a bottom surface and both ends in the longitudinal direction to support the anti-scratch protrusion.

3. The wing knob device of claim 1, wherein the wing inserting portion comprises a recessed groove portion formed depressed to allow the protruding portion to be inserted thereinto on both inner surfaces facing each other.

4. The wing knob device of claim 1, wherein the rear wing comprises an assembly groove formed gradually depressed toward a front end portion from a position adjacent to the auxiliary guide groove on both side surfaces so as to be opened forward, and guiding insertion of the anti-scratch protrusion into the auxiliary guide groove.

5. The wing knob device of claim 1, further comprising a guide structure provided between the rear wing and the front knob to guide longitudinal movement of the rear knob and the front knob
wherein the guide structure comprises:
a guide groove in a long shape in the longitudinal direction formed depressed in a front surface of the rear wing;
a guide portion formed protruding backward from the front knob and moving by being inserted into the guide groove;
a stopper formed in a protruding guide groove formed depressed in a longitudinal side of the guide groove and formed protruding in a position separated from an end portion of the protruding guide groove; and
a locking end portion formed in an end portion of an engaging protrusion formed protruding from the guide portion and inserted into the protrusion guide groove, and formed protruding backward from the end portion of the engaging protrusion and lockedly engaged to the stopper.

6. The wing knob device of claim 1, wherein the rear knob comprises a first coupling portion in the form of a hole formed in a front end portion surrounding the front knob, and the front knob comprises a first engaging portion in the form of a protrusion locked engaged to the first coupling portion.

7. The wing knob device of claim 6, wherein the rear knob comprises a second coupling portion in the form of a hook protruding forward from an inside of a depressed portion formed depressed in the front end portion, and the front knob comprises an engaging block inserted into the depressed portion, and a second engaging portion in the form of a hole formed to pass therethrough the second coupling portion in a forward/backward direction so as to be lockedly engaged to the front end portion after being inserted into the engaging block.

8. The wing knob device of claim 7, wherein the rear knob comprises a third coupling portion in the form of a protrusion formed in the front end portion surrounding the front knob, and the front knob comprises a third engaging portion formed depressed in a face facing the rear knob so as to allow the third coupling portion to be lockedly engaged thereto.

9. The wing knob device of claim 1, further comprising a knob rubber nested by being inserted into a rubber inserting portion formed depressed in an inner surface of a wing inserting portion of the rear knob and engaged to the rear knob, and supporting a rear end portion of the rear wing.

10. The wing knob device of claim 1, further comprising a decoration portion engaged to the rear knob to cover a rear end portion of the rear knob.

11. The wing knob device of claim 1, wherein the wing inserting portion comprises a protruding support portion protruding from inner side surfaces facing each other to support both side surfaces of the rear wing.

* * * * *